U nited States Patent [19]
Julian

[11] 3,821,121
[45] June 28, 1974

[54] PREPARATION OF WOOL WAX ALCOHOL PRODUCT OF LOW CHOLESTEROL CONTENT USEFUL AS DISPERSING AND EMULSIFYING AGENT

[76] Inventor: Percy L. Julian, 515 N.E. Ave., Oak Park, Ill. 60302

[22] Filed: Aug. 2, 1972

[21] Appl. No.: 277,240

Related U.S. Application Data

[62] Division of Ser. No. 137,028, April 23, 1971, Pat. No. 3,711,611.

[52] U.S. Cl............ 252/351, 252/309, 252/DIG. 1, 424/168, 424/172
[51] Int. Cl........................................... B01f 17/38
[58] Field of Search ........ 252/351, DIG. 1; 424/239

[56] References Cited
UNITED STATES PATENTS 2,676,149   4/1954   Woods et al....................... 252/42.1
3,101,300   8/1963   Siegal et al. .......................... 424/70
3,210,248   10/1965  Feldmann et al................... 424/239
3,272,851   9/1966   Sunde et al.......................... 260/428

FOREIGN PATENTS OR APPLICATIONS 643,422   9/1950   Great Britain................. 252/DIG. 1

Primary Examiner—Richard D. Lovering
Attorney, Agent, or Firm—Dawson, Tilton, Fallon & Lungmus

[57] ABSTRACT

A new and useful dispersing and emulsifying agent derived from wool grease made by separating cholesterol from the unsaponifiables and replacing the cholesterol with $\beta$-sitosterol, to form an improved essentially wool wax alcohol product.

6 Claims, No Drawings

PREPARATION OF WOOL WAX ALCOHOL PRODUCT OF LOW CHOLESTEROL CONTENT USEFUL AS DISPERSING AND EMULSIFYING AGENT

This application is a division of my copending application Ser. No. 137,028, filed Apr. 23, 1971, now U.S. Pat. No. 3,711,611.

BACKGROUND OF INVENTION

One of the earliest attacks on environmental pollution resided in the program of what to do in England with the grease that had to be scoured, sometimes with detergents, from native wool, prior to its use. That was in the height of the wool industry. The British government was compelled to crack down upon the dumping of this grease into the sewers and streams, resulting in clogging the former and converting the latter into veritable cess pools. As is very often the case, the remedy came in a new invention, resulting in the birth of what is now known as lanolin, a wool grease freed from dirt; deodorized and sometimes bleached. As is well known, Lanolin has become a sine qua non for the cosmetic industry, primarily because of its capacity to absorb water with the formation of emulsions with light mineral oils, and heavy petrolatum, such as Vaseline, etc.

The success of lanolin led to a more refined and for many purposes more effective product, namely, wool wax alcohols, whose emulsifying characteristics far exceed those of lanolin itself. Indeed, these alcohols — when dissolved in eight to 10 times their weight of certain mineral oils — cause the solution to absorb more than 250 times their (the alcohols) weight of water, resulting in beautiful and quite stable creams. Thus, these wool wax alcohols have enhanced, in large part, the variety of face creams, cleansing creams, hair creams and the like, available in the toiletries of feminine and, indeed, masculine "make-up." Wool wax alcohols are, therefore, today an important article of commerce.

Wool wax is composed, for the most part, of esters, compounds of alcohols with a variety of fatty acids. Prominent among these alcohols is another useful product, cholesterol, which constitutes as high as 25 to 32 percent of the alcohol fraction of wool grease. Alongside cholesterol, there are other alcohols, such as lanosterol, and lower molecular weight alcohols, some of which are glycols. The alcohol fraction is separated by saponification of the wool grease, and separation of the alcohols from the saponification mixture of free fatty acids and wool wax alcohols.

From the alcohol portion, over the past two and a half decades, cholesterol has been separated commercially. Prior to this event, commercial cholesterol was available largely from brains and spinal cords. The rise of labor costs in the separation of spinal cords; the growth of the pet animal feeds (where brains and other offals found exploitation); and the supplanting of cholesterol (for sex and adrenal hormone manufacturing) by such naturally occurring sterols and steroids as stigmasterol (from soybean oil), diosgenin (from the "wild yams" of the Dioscorea family), and hecogenin (from sisal juice) — have resulted in the use of wool wax alcohols as the most economical source of cholesterol.

Cholesterol, however, has one use for which no other product has been able to supplant it, namely, the synthesis of Vitamin $D_3$, a vitamin absolutely essential to the life and well-being of all two-footed animals. With the growth of fowl as a major item in the human diet, the economical manufacture of cholesterol is, therefore, of definite industrial significance. Just in the last 25 years, the usage of synthetic Vitamin $D_3$, in the United States alone, has risen from less than 10 trillion International units annually to an estimated 650 trillion International units annually.

Moreover, the growing interest in the exploitation of liquid crystals, of which a large number are esters of cholesterol, is destined soon to find cholesterol in short supply. Significant is the fact that no other sterol esters have been found to exhibit the liquid crystal effects of most of the liquid crystal cholesterol esters. Another factor which may contribute to the shortage of cholesterol is the constantly growing replacement of wool by synthetic fibres. With wool scouring at an all-time low and the shutdown of many woolen mills, a more economic production of cholesterol must be achieved.

It has been demonstrated that Cholesterol is in large part responsible for the unique ability of wool wax alcohols to form the remarkable water-in-oil emulsions, represented by the creams described above. It has also been demonstrated that the residual wool wax alcohols — after removal of cholesterol — are poor emulsifiers and virtually useless for the cosmetic creams and lotions described. Indeed, E. V. Truter (Cleaver-Hume Press, Ltd., London, 1956, p. 160), in speaking of the extraction of cholesterol from wool grease, states: "In recent years the growing demand for cholesterol .... has resulted in the adaptation of suitable old methods, and the development of new ones designed specifically for the extraction of cholesterol (from wool wax alcohols), the residual alcohols being of relatively little importance except to the academic research worker."

Herein lies a great stumbling block to the use of wool wax alcohols (constituting almost 50 percent by weight of the wool grease) for the preparation of cholesterol, as is obvious from the following figures:

50 pounds Refined (molecularly distilled) wax alcohols are marketed at an average price of $1.50 per pound, or $75.00.

12 pounds pure U.S.P. cholesterol (the average quantity successfully extracted and refined from these 50 pounds) at ca. $6.00 per pound or $72.00.

Thus, why go to the trouble of preparing cholesterol from these valuable alcohols, since the residual alcohols, left after cholesterol extraction, are virtually useless?

If, however, another and cheaper sterol could be found, which could be incorporated into the "spent" alcohols (the alcohols after removal of cholesterol) in such a manner and quantity as to bring these spent alcohols up to the emulsifying capacity of the "cholesterol-bearing" wool wax alcohols, the economics of cholesterol extraction from wool grease would be greatly improved.

SUMMARY OF INVENTION

It is, therefore, an object of the present invention to find a use for wool wax alcohols after removal of the cholesterol therefrom.

It is a further object of the invention to devise, develop or locate a substance or substances which might replace cholesterol in wool wax alcohols, and still bring about a wool wax alcohol mixture with emulsifying and other characteristics equal to or improved over "intact" wool wax alcohols.

Still another object of this invention is to replace the cholesterol in wool grease by another sterol, equal in stability and contributing essentially the same emulsifying, emollient and other significant properties to the wool wax alcohols as does cholesterol.

Still a further object of the invention — bearing in mind the important emollient characteristics of wool wax alcohol creams, and possible absorption of certain ingredients into the blood stream, thus possibly upsetting dangerously the maximum cholesterol allowance in the blood stream — is to replace cholesterol in wool wax alcohols with another sterol which is non-irritating, non-toxic and non-controversial from a health point of view, yet retaining essentially the same emulsifying, emollient and other desirable properties as unaltered "natural" wool wax alcohols.

Yet another object of the invention is to reduce markedly the amount of cholesterol present in wool wax alcohols.

Still another object of this invention is to replace cholesterol in wool wax alcohols, wholly or in part, with a sterol similar in structure, but much less expensive than cholesterol, yet extending to the wool wax alcohols essentially the same, or even enhanced, desirable characteristics as are embodied in the "intact" wool wax alcohols.

Yet a valuable object of this invention is to improve the economics of cholesterol manufacture, via extraction from wool wax alcohols, by almost doubling the present financial return from wool wax alcohols, and thus enhancing the prospects of cholesterol production on a scale to meet indispensable human and animal health needs and the presently growing demand.

Still a final object of this invention is to find satisfactory methods for incorporating into "spent" wool wax alcohols (wool wax alcohols from which cholesterol has been extracted substantially wholly or in part) a sterol which enchances and/or equals the desirable characteristics hitherto attributed to Cholesterol.

I have found that the objects of this invention have been achieved by replacing the cholesterol in wool wax alcohols by "Sitosterol" from soybean oil, or from other sources such as Tallol, or sometimes called Tall Oil (from waste paper pulping liquors), cottonseed oil, etc. At the present time thousands of tons of such sitosterols are available at only a fraction of the cost of cholesterol. Moreover, I have found that the other sterols present in small quantities in the naturally occurring "sitosterols," such as campesterol and brassicasterol, do not inhibit the action of sitosterol and probably act as effective as the latter. Thus, by the term sitosterol I include β-sitosterol and other naturally occurring products that may be extracted along from soya oil, Tall oil, and cottonseed oil and generally termed sitosterol.

To achieve the foreoing objects of this invention, my process in outline is essentially as follows:

A. Beginning with Crude or Refined Wool Grease
1. Saponification of the wood grease to produce essentially a mixture of wool wax alcohols and metallic salts (soaps) of wool wax fatty acids.
2. Separation of the wool wax alcohols from the soaps.
3. Substantial removal of cholesterol from the wool wax alcohols without chemical damage to the residual wool wax alcohols.
4. Incorporating a mixture of sterols, consisting mainly of naturally-occurring sitosterol into the "spent" wool wax alcohols.
5. Where desirable, subjecting the reconstituted and modified wool wax alcohols in whole or in part to further traditional refinement, such as molecular distillation, or other purification methods, to remove tarry, resinous-like materials, and to improve color and odor.

The result is a pale yellow crystalline-like solid mass, indistinguishable in appearance from "refined natural" wool wax alcohols, possessing a pleasant odor, and exhibiting emulsifying properties equal to or superior to the "natural" wool wax alcohols, depending upon the extent of "purification."

B. Beginning With Commercially-Available Wool Wax Alcohols

Another mode of preparation of my product consisted in extracting cholesterol from commercially-available wool wax alcohols, and incorporating the new sterol into the residual alcohol mixture, and refining the mixture to uniformity and to the desirable characteristics mentioned in the foregoing.

DETAILED DESCRIPTION

The following examples illustrate the invention:

EXAMPLE 1

The essentially solvent-free mixture of soaps and wool grease alcohols resulting from the saponification of wool grease, is treated with a suitable solvent, which dissolves the wool grease alcohols and leaves the solid metallic salts of the fatty acids. The latter are separated from the solution by filtration, or centrifuging. The solvent is distilled from the solution of the wool wax alcohols, and the cholesterol is removed from the wool wax alcohols by conventional methods such as those described in Truter's "Wool Wax" (loc. cit.), pp. 160–194 (62 references on the isolation of Cholesterol); J. Th. Hackmann, Rec. Trav. Chim. 69, 433 (1950); British Pat. No. 622,725 (1949); H. W. Knol, U.S. Pat. No. 2,536,753 (1951).

The crude soya, tallol, or cottonseed sitosterols may be separated by methods such as are described by P. L. Julian in U.S. Pat. Nos. 2,218,971 (1940); 2,273,045 (1942) and 2,273,046 (1942); and by overhoff and Hackmann, Canadian Pat. No. 519,754 (1955), and Greiner and Fevig, Ind. & Eng. Chem. 53, 949 (1961). The crude sitosterols may be refined by crystallization or by separating them from resins, etc., as described in the above-cited references.

A solution of 70 kg. of essentially cholesterol-free wool wax alcohols, 30 kg. crude sitosterol (from soya sterols) and 100 g. BHT (butylated hydroxy toluene, or strictly, 2,6-di-tert-butyl-4-methylphenol, as antioxidant) — all in 100 L. benzene — was prepared. The solvent was distilled off, the final freeing from solvent done under reduced pressure. The uniform mixture was molecularly distilled at 200°/25–35 microns to give 80 kg. modified wool wax alcohols, m.p. in the range of 89°–90° C.

EXAMPLE 2

A preparation of 80 kg. of modified wool wax alcohols, as described in Example 1, was made from commercially available wool wax alcohols, B.P. The cholesterol was isolated from the latter by conventional methods, and the sitosterol-containing product prepared as in Example 1. The melting point and other characteristics of this preparation were essentially the same as in Example 1.

EXAMPLE 3

Still another 80 kg. of modified and greatly improved wool wax alcohols, were prepared as follows: A solution of wool wax alcohols, from which the cholesterol had been essentially removed, was concentrated, whereupon an average of 60 percent of the higher melting alcohols crystallized as an almost colorless product. The latter was separated from the supernatant liquors, which liquors on freeing from low-boiling solvent, were subjected to molecular distillation, yielding an almost colorless distillate of relatively lower boiling wool wax alcohols in essentially quantitative yield. This latter fraction was added to the crystals and to this mixture 25 kg. of highly-purified sitosterol was added. The mixture was cautiously melted (in an atmosphere of nitrogen) to a uniform consistency, antioxidant added, and allowed to cool to a pale yellow solid. This mixture of modified wool wax alcohols represented for some cosmetic purposes a great improvement over those described in Examples 1 and 2. Moreover, this preparation obviates the necessity of subjecting the whole alcohol mixture (including the sitosterol) to the expensive molecular distillation, thus improving the economics of the preparation.

EXAMPLE 4

A 50 g. sample of a solution prepared by dissolving 6 g. modified wool wax alcohols (from Example 1) in 48 g. Protol, USP (white mineral oil of Sonneborn Division, Witco Chemical Comapny, having a specific gravity at 60° F. of 0.970–0.880, Saybolt viscosity at 100° F. 180–190, and Kinematic viscosity at 37.8° F. 38.6–40.9) was heated to ca. 60° C. To this solution was added water, heated to ca. 60° C., in approximately 10 ml. quantities at a time, while the mixture was beaten in a Sunbeam mixmaster, Model MM 200WS, at speed 4. Water was added at a rate so that the previous quantity was absorbed before the next quantity was added. After 100 ml. water had been added, absorption was more rapid and water could be added in larger portions (ca. 30–40 ml.). The average total water absorption was 793 ml. After many such runs with this preparation (from Example 1) and others as prepared in Examples 2 and 3, using soya sterols and sterols isolated from Tall oil, I rated the emulsion stabilities, resulting from the water absorption as follows:

"Poor" = Emulsion breaks in ca. 3 days.
"Fair" = Emulsion stands firm 1 to 2 weeks.
"Good" = Emulsion stands firm 1 month.
"Excellent" = Emulsion stands firm several months.

The emulsion in Example 4 is rated "good."

The sterols were isolated from Tall Oil as indicated in U.S. Pat. Nos. 2,218,971, 2,273,045 and 2,273,046 and/or U.S. Pat. No. 2,536,753.

EXAMPLE 5

A 50 g. sample of solution as prepared in Example 4, except originating from modified wool wax alcohols as described in Example 2, was treated as in Example 4. The average total water absorption was 1,153 ml. to form an emulsion of excellent stability.

EXAMPLE 6

A 50 g. sample of solution as prepared in Example 4, except containing only wool wax alcohols commercially available from Takasago Perfumery Company, Ltd., Japan, m.p. 52° C., was treated as in Example 4. The average total water absorption was 676 ml. to give an emulsion of poor stability.

EXAMPLE 7

A 50 g. sample of solution as prepared in Example 4, except containing only wool wax alcohols commercially available from Takasago Perfumery Co., Ltd. (but which alcohols I had subjected to molecular distillation at 200°/25–35 microns in 80 percent yield), m.p. 61° C., was treated as in Example 4. The average total water absorption was 865 ml. to form an emulsion of fair stability.

EXAMPLE 8

A 50 g. sample of solution as prepared in Example 4, except containing only wool wax alcohols commercially available from Croda, Inc., New York, under the label Hartolan, m.p. 65° C., was treated as in Example 4. The average total water absorption was 993 ml. to give an emulsion of good stability.

EXAMPLE 9

A 50 g. sample of solution as prepared in Example 4, except containing only wool wax alcohols commercially available from Croda, Inc., under the label Super Hartolan, m.p. 75° C., was treated as in Example 4. The average total water absorption was 1,187 ml. to form an emulsion of excellent stability.

EXAMPLE 10

A 50 g. sample of solution as prepared in Example 4, except containing only wool wax alcohols commercially available from Westbrook-Marriner, Inc., Lawrence Mass. under the label Argowax, Standard, m.p. 64° C., was treated as in Example 4. The average water absorption was 858 ml. to give an emulsion of good stability.

EXAMPLE 11

A 50 g. sample of solution as prepared in Example 4, except containing only wool wax alcohols commercially available from Westbrook-Marriner, Inc., under the label Argowax, Distilled, m.p. 73° C., was treated as in Example 4. The average total water absorption was 1,028 ml. to form an emulsion of excellent stability.

EXAMPLE 12

A 5 g. sample of modified wool wax alcohols (Example 1) was dissolved in 45 g. Carnation, F.F. mineral oil (white mineral oil of Sonneborn Division, Witco Chemical Company, specific gravity at 60° F. 0.835–0.845, Saybolt viscosity at 100° F. 65–75, Kinematic viscosity at 37.8° F. 11.7–14.4). This solution was heated to ca. 60° C. and water at 60° C. was added as in Example 1. This water absorption was 1,181 ml. to give an emulsion of excellent stability.

EXAMPLE 13

A 5 g. sample of modified wool wax alcohols prepared as in Example 2, was treated as in Example 12.

The average total water absorption was 1,605 ml. to give an emulsion of excellent stability.

EXAMPLE 14

A 5 g. sample of modified wool wax alcohols prepared as in Example 3, and treated as in Example 12, absorbed an average total of 1,780 ml. of water to give an emulsion of excellent stability. This is especially significant in that this preparation is the most commercially favored one and also displays other desirable characteristics, such as improved color and lowered melting point.

EXAMPLE 15

A 5 g. sample of wool wax alcohols commercially available from Takasago Perfumery Co., Ltd. was treated as in Example 12. The average total water absorption was 1,008 ml. to give an emulsion of good stability.

EXAMPLE 16

A 5 g. sample of wool wax alcohols commercially available from Takasago Perfumery Co., Ltd. (but which we had subjected to molecular distillation at 200°/25–35 microns in 80 percent yield) was treated as in Example 12. The average total water absorption was 1,433 ml. to give an emulsion of good stability.

EXAMPLE 17

A 5 g. sample of wool wax alcohols commercially available under the label Hartolan was treated as in Example 12. The average total water absorption was 1,608 ml. to form an emulsion of excellent stability.

EXAMPLE 18

A 5 g. sample of wool wax alcohols commercially available under the label Super Hartolan was treated as in Example 12. The average total water absorption was 1,630 ml. to give an emulsion of excellent stability.

EXAMPLE 19

A 5 g. sample of wool wax alcohols commercially available under the label Argowax Standard was treated as in Example 12. The average total water absorption was 1,310 ml. to afford an emulsion of excellent stability.

EXAMPLE 20

A 5 g. sample of wool wax alcohols commercially available under the label Argo Distilled was treated as in Example 12. The average total water absorption was 1,803 ml. to afford an emulsion of excellent stability.

A comparison of pertinent characteristics is as follows:

from the wool wax alcohols and replace the same with sitosterol. Thus, under current conditions, it is economically feasible to replace about 15 percent to about 35 percent of the weight of the alcohol fraction to wool grease — the replacement by sitosterol being desirably approximately quantitative as far as the equivalent weights of the two sterols are concerned.

Advantageously, an antioxidant is added in the range of about 0.01 percent to about 1 percent — normally about 0.1 percent of the weight of the mixture of the wax alcohols in which the cholesterol has been substantially replaced by sitosterol. In some instances, however, this may not be necessary. At present, butylated hydroxytoluene, is commonly employed for this purpose although a wide variety of antioxidants for organic materials is currently available to those skilled in the art. For example, the British Pharmacopoeia (1968), specifies that a wool wax alcohol mixture contains not less than 500 nor more than 1,000 parts per million of butylated hydroxyanisole or butylated hydroxytoluene.

While the foregoing examples illustrate this invention, I am not limited by them. Thus, for example, the quantity of "sitosterol" incorporated into the "spent" alcohols (the latter referring to alcohols freed from most and/or essentially all of the cholesterol) might vary, depending upon the desired melting point of the final product, the mineral oil carrier, and the particular emulsifying use to which the newly-constituted alcohols might be put.

It will be appreciated that the invention provides a product which even though substantially cholesterol free still has at least about 30 percent digitonin precipitable steroids. This new composition of matter removes at least in large part the hazard of possible cholesterol absorption into the blood stream, particularly when such a material may be frequently applied to the skin.

The invention also provides a process for the economic production of cholesterol, in these days of declining wool grease production, and constantly increasing demand for cholesterol for Vitamin $D_3$ production, be extracting cholesterol from commercially-available wool wax alcohols, and returning the essentially cholesterol-free residues to their former value as emulsifiers by producing a sitosterol-fortified product thus doubling the revenue because of utilization of an essentially cholesterol-free residue hitherto considered useless. The resultant produce is enhanced by molecular distillation to give a color refinement and freedom from resinous or polymeric and/or high-boiling materials.

Advantageously in this operation the refined impositions may represent as high as 60–70 percent of the material subjected to distillation. Since the molecular dis-

| Alcohols | M.P., °C. | Average digitonin precipitable steroids, percent | Average acid value | Average hydroxyl value | Average saponification value, mg. |
|---|---|---|---|---|---|
| Modified and improved wool wax alcohols (Example 1) | 90 | 36 | 2.1 | 131 | 1.2 |
| Modified and improved wool wax alcohols (Example 3) | 70 | 32 | 1.9 | 145 | 4.0 |
| Takasago alcohols | 62 | 32 | 1.4 | 150 | |
| Hartolan | 85 | Min. 28 [1] | Max. 2.0 [1] | | Max. 5.[1] |
| Super Hartolan | 75 | Min. 30 [1] | Max. 1.5 [1] | 120–160 [1] | Max. 5.[1] |
| Argowax standard | 64 | 34 [1] | 1.8 [1] | 169 [1] | 9.0 |
| Argowax distilled | 73 | 4.15 [1] | 1.2 [1] | 162 [1] | 5.0 |

[1] Manufacturer's specifications.

Based upon current economics, I find it desirable to remove substantially all of the removable cholesterol tillation is an expensive process, particularly for high-boiling and heat sensitive products, this guarantees an economic advantage over present commercially distilled wool wax alcohols.

I claim:

1. A method of preparing a novel wool wax alcohol comprising the steps of removing a substantial portion of cholesterol from a wool wax alcohol and adding an equivalent amount of sitosterol.

2. A method according to claim 1 in which the wool wax alcohol is derived from wool grease by saponification, separating the saponified and unsaponified portions, and removing the cholesterol from the said saponified portion.

3. A method according to claim 2 in which the said unsaponifiable portion represents a wool wax alcohol mixture at least about equal to wool wax alcohols, B.P. (British Parmacopiae).

4. A method according to claim 1 in which the cholesterol-depleted, sitosterol fortified wax alcohol product is subjected to molecular distillation to reduce the concentration of resinous or polymeric and/or high-boiling materials and improve color.

5. A method according to claim 4 in which the refined composition represents from about 70 percent to about 90 percent of the material subjected to distillation.

6. A method according to claim 1 in which an essential portion of the wool wax alcohols has been removed by crystallization, and only the remaining oily lower boiling crude alcohols subjected to molecular distillation, followed by uniform mixture of the crystalline and molecularly distilled portions.

* * * * *

UNITED STATES PATENT OFFICE
CERTIFICATE OF CORRECTION

Patent No. 3,821,121  Dated June 28, 1974

Inventor(s) PERCY L. JULIAN

It is certified that error appears in the above-identified patent and that said Letters Patent are hereby corrected as shown below:

Col. 3, line 61, change "wood" to -- wool --.

Col. 4, line 46, change "and" (second occurrence) to -- also --; same line, capitalize "Overhoff".

Col. 7, in the table under Example 20 (last line thereof) relating to "Argowax distilled", the numerals "$4.15^1$" should be -- $41.5^1$ --.

Col. 8, line 4, change "to" to -- of --;
line 48, change "produce" to -- product --;
lines 51-52, change "impositions" to -- composition --.

Signed and sealed this 5th day of November 1974.

(SEAL)
Attest:

McCOY M. GIBSON JR.  C. MARSHALL DANN
Attesting Officer  Commissioner of Patents